United States Patent
Link et al.

(10) Patent No.: US 6,848,712 B2
(45) Date of Patent: Feb. 1, 2005

(54) METHOD OF TRIGGERING A VEHICLE OCCUPANT RESTRAINING DEVICE

(75) Inventors: Andrea Link, Munich (DE); Willibald Watzka, Aichach (DE); Christian Maurer, Karlsdorf/Forstern (DE); Michael Niess, Dachau (DE); Jan Urbahn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/254,918

(22) Filed: Sep. 26, 2002

(65) Prior Publication Data

US 2003/0057685 A1 Mar. 27, 2003

(30) Foreign Application Priority Data

Sep. 27, 2001 (DE) .......................................... 101 47 732

(51) Int. Cl.[7] .......................... B60R 21/01; B60R 21/32
(52) U.S. Cl. ........................................ 280/735; 180/282
(58) Field of Search ........................ 280/735; 307/10.1; 180/282; 701/45

(56) References Cited

U.S. PATENT DOCUMENTS

| 4,641,041 A | * | 2/1987 | Mattes et al. ................ 340/438 |
| 4,842,301 A | * | 6/1989 | Feldmaier ................... 280/735 |
| 4,975,850 A | * | 12/1990 | Diller ........................... 701/45 |
| 5,418,722 A | * | 5/1995 | Cashler ........................ 701/45 |
| 5,521,822 A | * | 5/1996 | Wang ........................... 701/45 |
| 5,538,099 A | * | 7/1996 | Blackburn et al. ........... 180/282 |
| 5,566,974 A | * | 10/1996 | Mazur et al. ............. 280/730.2 |
| 5,999,871 A | | 12/1999 | Liu |
| 6,047,985 A | * | 4/2000 | Yoshida ....................... 280/735 |
| 6,154,698 A | * | 11/2000 | Walden et al. ................ 701/45 |
| 6,168,197 B1 | * | 1/2001 | Paganini et al. ............. 280/735 |
| 6,199,903 B1 | | 3/2001 | Brambilla et al. .......... 280/735 |
| 6,219,606 B1 | * | 4/2001 | Wessels et al. ............... 701/45 |
| 6,460,882 B1 | * | 10/2002 | Andres ........................ 280/735 |

FOREIGN PATENT DOCUMENTS

| DE | 198 16 989 A | 11/1999 |
| JP | 2001-294115 | 10/2001 |

OTHER PUBLICATIONS

European Search Report mailed Sep. 29, 2003.

\* cited by examiner

*Primary Examiner*—Ruth Ilan
(74) *Attorney, Agent, or Firm*—Crowell & Moring LLP

(57) ABSTRACT

In a method of triggering a vehicle occupant restraining device, at least one sensor signal generated by a crash sensor is supplied to an analyzing device, which determines the crash severity, and a time for the triggering of the restraining device based on the crash severity. When a first low crash severity occurs, a timer is started and the restraining device is triggered by the analyzing unit only when a higher crash severity is reached during the running time of the timer.

9 Claims, 1 Drawing Sheet

METHOD OF TRIGGERING A VEHICLE OCCUPANT RESTRAINING DEVICE

BACKGROUND AND SUMMARY OF THE INVENTION

This application claims the priority of German patent document 101 47 732, filed 27 Sep. 2001, the disclosure of which is expressly incorporated by reference herein.

The invention relates to a method of triggering a vehicle occupant restraining device.

In a method of this generic type disclosed in U.S. Pat. No. 5,999,871, the severity of the crash is determined by means of an acceleration signal which is supplied by an acceleration sensor. If this acceleration signal reaches a defined threshold value, it is deemed to reach the decisive severity of a crash. The restraining device—here, a first stage of an air bag—is triggered immediately. In this triggering algorithm, it is difficult to distinguish between an actual crash, and extreme stress to the vehicle, which occurs for example, during a fast drive along a gravel and pothole covered route. Accelerations occur in the latter case which are comparable to those of an actual crash. In order not to trigger the restraining device during such a drive, the decisive threshold value is increased in the factory. As a result, in the event of a crash, the restraining device may not be triggered or at least may not be triggered in time.

An additional fact is the lack of conformity of the response behavior of the sensor in the case of different vehicles of the same manufacturer and of the same type. It was found that the stability of macroscopically identical vehicles may differ. Since the method of operation of an acceleration sensor depends on its stability, the triggering of the restraining device differs while it is naturally assumed that the crash is identical in the case of vehicles of the same construction.

It is an object of the invention to provide a method of the initially mentioned type which achieves a constant and reproducible triggering point in time for the restraining device.

This and other objects and advantages are achieved by the method according to the invention wherein a timer is started when a first low crash severity occurs. In this case, it will not be necessary to differentiate between the above-mentioned very stressful drive and a crash, so that it is permissible for the timer to be triggered during such a drive. The crash event will be clearly recognized only by an additional triggering condition, in the form of the occurrence of a higher crash severity.

The triggering time for the restraining device is again determined by the timer. The restraining device will be triggered at the end of the running time of the timer if the higher severity of the crash has occurred during this running time. As an alternative, if the higher crash severity does not occur before the end of the running time, triggering takes place thereafter, as soon as a higher crash severity does occur, provided only that the timer has not yet been reset. Such resetting takes place as soon as the analyzing unit has clearly recognized that no crash is occurring, for example, by means of a "0" value of the acceleration sensor signal. As an alternative, deactivation can take place based on an independent criterion, such as the resetting of the alarm by means of a Saving sensor.

With such an arrangement, it is possible to immediately trigger one or more restraining devices during the running time of the timer if a still higher crash severity is reached during this time. While the one such restraining device may be, for example an active knee guard, another, which will be triggered immediately when a crash of a particularly high severity occurs, may be, for example an air bag.

According to one embodiment of the invention, triggering of the restraining device takes place under the conditions
  "counter reading=0" and
  "occurrence of a higher crash severity".

In this case, it is not important which of the two conditions occurs first. The ignition circuit will only be triggered when both conditions have been met. If no ignition takes place, the timer will be deactivated again.

Other objects, advantages and novel features of the present invention will become apparent from the following detailed description of the invention when considered in conjunction with the accompanying drawings.

DETAILED DESCRIPTION OF THE INVENTION

Figure 1:
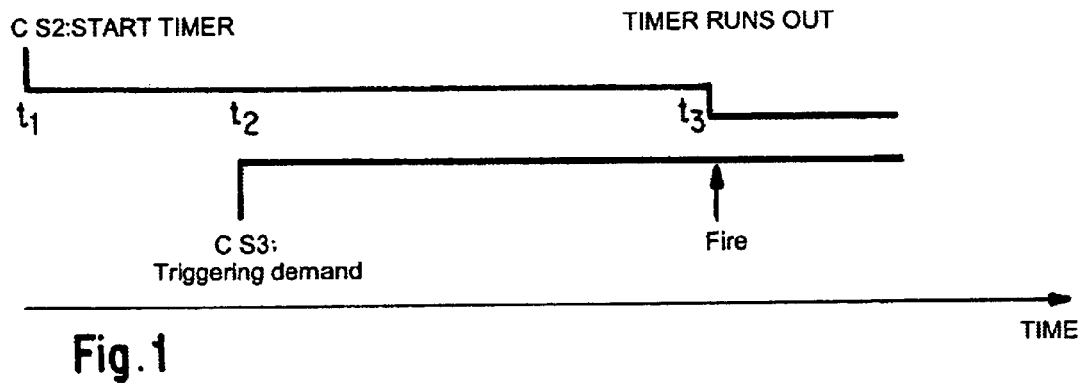
FIGS. 1–3 are time lines which illustrate the operation of the triggering method according to the invention in different circumstances.

In FIG. 1, a crash severity ("CS") whose value CS2 is above a value of CS1 that occurs in the normal driving operation, results in the start of a timer (not shown) at time $t_1$. During a running time of, for example, 10 ms, the timer counts down from its initial value. However, before the end ($t_3$) of this running time (that is, before the count reaches zero at time $t_3$), a second condition (a higher crash severity CS3) occurs (time $t_2$) for the triggering of the restraining device. The ignition circuit (not shown) for the restraining device is ignited ("fire") thereafter, at the end of the running time of the timer.

In FIG. 2, CS2 results, once again, in the start of the timer at time $t_1$. The running time ends at time $t_3$, and the timer remains at 0 ms waiting time. Thereafter, at time $t_4$, the second condition occurs in the form of the higher crash severity CS3. The ignition circuit is triggered immediately at time $t_4$ ("fired") because the timer has already run out.

Figure 2:
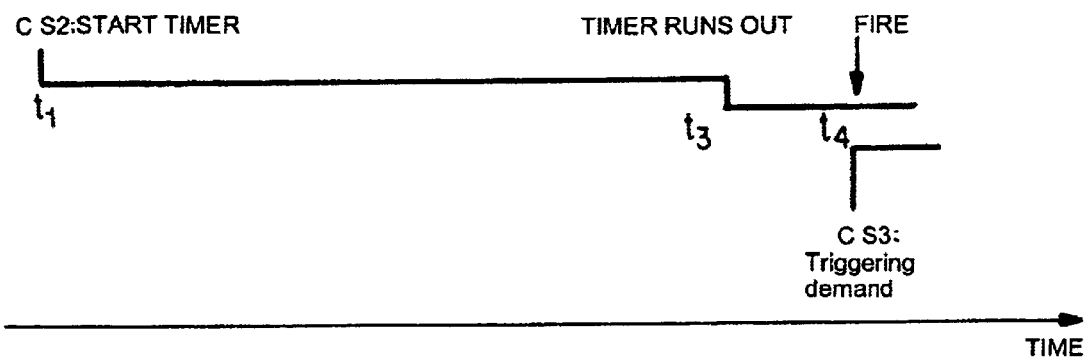
Figure 3:
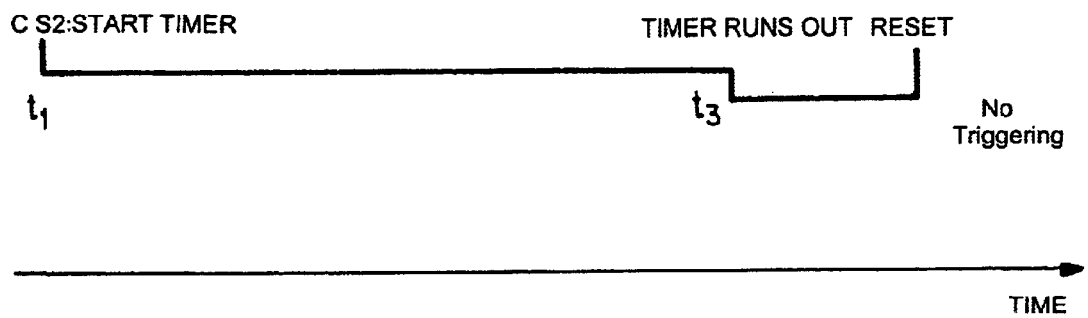

Finally, in FIG. 3, CS2 results in the start of the timer ($t_1$), which counts down to zero ($t_3$). Thereafter, the timer is deactivated upon occurrence of a reset criterion. The ignition circuit is not triggered. If the crash severity CS2 recurs subsequently, the sequence is repeated according to FIG. 1, 2 or 3, as applicable.

As a result of the expanded functionality of the timer, the ignition points in time become significantly more constant. The crash severity CS2 is recognized early and in a reproducible manner, so that, when the same event is repeated with the same vehicle, CS2 is also recognized at the same point in time.

The point in time when the crash severity CS3 occurs on the other hand is more variable. (The crash severities are precisely defined such that CS2 will be very reproducible, but that CS3 should be recognized as early as possible.) With the timer operation being commenced in response to CS2, when CS3 is recognized before the time runs out, a constant ignition point in time is achieved, even if the times when CS3 is recognized fluctuate. A triggering at CS2 is not desirable because the latter may be recognized even in the case of low-energy accidents in which ignition circuit is not necessary.

In summary, to trigger the ignition circuit, both the expiration of the time period counted by the timer and a triggering demand are required. As shown in FIGS. 1 and 2 ignition takes place when the second of these two events occurs. In the case of FIG. 3, only the timer is started, and no ignition takes place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of triggering a vehicle occupant restraining device, in which a crash sensor supplies at least one sensor signal to an analyzing device, which determines from the sensor signal a crash severity and a time for triggering of the restraining device, wherein:

when said analyzing device determines that a first crash severity occurs, a timer having a set running time is started; and when said analyzing device determines that a second crash severity greater than said first crash severity occurs at a point in time which is during the running time of the timer, the restraining device is triggered by the analyzing unit only upon expiration of said running time.

2. The method according to claim 1, wherein:

when a second crash severity greater than said first crash severity occurs after a running time of the timer has expired, the restraining device is triggered by the analyzing unit upon occurrence of said higher crash severity.

3. The method according to claim 1, wherein the restraining device is triggered by the analyzing unit at the end of a triggering time defined by the timer.

4. The method according to claim 1, wherein:

when defined conditions occur, the timer can be reset; and after its running time and when the higher crash severity is reached, the timer triggers the restraining device as long as the timer has not yet been reset.

5. The method according to claim 2, wherein:

when defined conditions occur, the timer can be reset; and after its running time and when the higher crash severity is reached, the timer triggers the restraining device as long as the timer has not yet been reset.

6. A method for triggering a vehicle safety device, comprising:

an analyzing device determining occurrence of a crash and a severity thereof;

upon said analyzing device determining occurrence of a low severity crash, starting timing of a fixed time period; and thereafter, triggering said vehicle safety device immediately upon the later of expiration of the fixed time period; and said analyzing device determining occurrence of a high severity crash at a point in time prior to a resetting of timing of the fixed time period.

7. The method according to claim 6, wherein resetting of the timing occurs upon fulfillment of conditions confirming that no crash has occurred.

8. A method for triggering a vehicle safety device, comprising:

a crash sensor generating a sensor signal that is indicative of a dynamic parameter associated with a crash;

an analyzing device determining whether said sensor signal exceeds a first, relatively lower, threshold value;

in response to said sensor signal exceeding said first threshold value, starting a timer having a set running time;

subsequent to said sensor signal exceeding said first threshold value, said analyzing device detecting whether said sensor signal becomes greater than a second, relatively higher, threshold value;

when said analyzing device determines that said sensor signal becomes greater than said second threshold value at a point in time which is during said set running time, triggering said safety device upon expiration of said set running time; and when said analyzing device determines that said sensor signal becomes greater than said second threshold value at a point in time which is after expiration of said set running time, triggering said safety device at said point in time when said sensor signal becomes greater than said second threshold value.

9. A method of triggering a vehicle safety device, comprising:

generating a sensor signal that is indicative of a dynamic parameter associated with a crash;

starting a timer having a set running time in response to detection that said sensor signal exceeds a first threshold value;

an analyzing device generating a triggering demand at a point in time at which it is detected that said sensor signal becomes greater than a second threshold value;

when said point in time occurs during said set running time, triggering said safety device upon expiration of said set running time;

when said point in time occurs after expiration of said set running time, triggering said safety device at said point in time.

* * * * *